(12) United States Patent
Ganesan et al.

(10) Patent No.: US 9,996,440 B2
(45) Date of Patent: Jun. 12, 2018

(54) FAULT TOLERANCE USING SHARED MEMORY ARCHITECTURE

(71) Applicant: VMWARE, INC., Palo Alto, CA (US)

(72) Inventors: Hariharan Jeyaraman Ganesan, Bangalore (IN); Jinto Antony, Bangalore (IN); Madhusudhanan Gangadharan, Bangalore (IN); Saju Chengat, Bangalore (IN)

(73) Assignee: VMware, Inc., Palo Alto, CA (US)

(*) Notice: Subject to any disclaimer, the term of this patent is extended or adjusted under 35 U.S.C. 154(b) by 61 days.

(21) Appl. No.: 15/292,186

(22) Filed: Oct. 13, 2016

(65) Prior Publication Data

US 2017/0364428 A1 Dec. 21, 2017

(30) Foreign Application Priority Data

Jun. 20, 2016 (IN) .............................. 201641021095

(51) Int. Cl.
  *G06F 11/00* (2006.01)
  *G06F 11/30* (2006.01)
  *G06F 11/20* (2006.01)
  *G06F 3/06* (2006.01)
  *G06F 11/14* (2006.01)

(52) U.S. Cl.
  CPC ........ *G06F 11/3037* (2013.01); *G06F 3/0619* (2013.01); *G06F 3/0665* (2013.01); *G06F 3/0685* (2013.01); *G06F 11/1407* (2013.01); *G06F 11/1471* (2013.01); *G06F 11/1484* (2013.01); *G06F 11/2058* (2013.01); *G06F 11/2069* (2013.01); *G06F 11/301* (2013.01); *G06F 11/3051* (2013.01); *G06F 2201/815* (2013.01); *G06F 2201/84* (2013.01)

(58) Field of Classification Search
  USPC ................................................. 714/6.23, 6.1
  See application file for complete search history.

(56) References Cited

U.S. PATENT DOCUMENTS

2007/0220369 A1* 9/2007 Fayad ................. G06F 11/1004
  714/48
2014/0006877 A1* 1/2014 Zhu ..................... G06F 11/3466
  714/45

(Continued)

OTHER PUBLICATIONS

Julian Wood, "What's New in vSphere 6.0: Multi-CPU Fault Tolerance", Aug. 26, 2014, 8 pages.

(Continued)

*Primary Examiner* — Sarai E Butler

(57) ABSTRACT

Examples provide a fault tolerant virtual machine (VM) using pooled memory. When fault tolerance is enabled for a VM, a primary VM is created on a first host in a server cluster. A secondary VM is created on a second host in the server cluster. Memory for the VMs is maintained on a shared partition in pooled memory. The pooled memory is accessible to all hosts in the cluster. The primary VM has read and write access to the VM memory in the pooled memory. The secondary VM has read-only access to the VM memory. If the second host fails, a new secondary VM is created on another host in the cluster. If the first host fails, the secondary VM becomes the new primary VM and a new secondary VM is created on another host in the cluster.

20 Claims, 10 Drawing Sheets

(56) References Cited

U.S. PATENT DOCUMENTS

2015/0254123 A1* 9/2015 Loekstad ............ G06F 11/0724
714/42
2016/0103744 A1* 4/2016 Antony ................... G06F 3/065
714/4.12

OTHER PUBLICATIONS

Unknown, "Cloud Architecture Optimized for Software-Defined Structure", Intel Corporation, captured Jun. 6, 2016, http://www.intel.com/content/www/us/en/architecture-and-technology/intel-rack-scale-architecture.html, 9 pages.
J. Kumar, "Rack Scale Architecture—Platform and Management", Intel Corporation, Copyright © 2014, 46 pages.

* cited by examiner

US 9,996,440 B2

FAULT TOLERANCE USING SHARED MEMORY ARCHITECTURE

RELATED APPLICATIONS

Benefit is claimed under 35 U.S.C. 119(a)-(d) to Foreign application Serial No. 201641021095 filed in India entitled "FAULT TOLERANCE USING SHARED MEMORY ARCHITECTURE", on Jun. 20, 2016, by VMware, Inc., which is herein incorporated in its entirety by reference for all purposes.

BACKGROUND

Typically, fault tolerance for a virtual machine (VM) running on a host in a cluster of VM hosts involves creating a shadow copy of a primary VM. The memory changes in the primary VM are updated to the memory of the shadow copy. If the primary VM goes down, the shadow copy starts functioning to prevent downtime for the VM. Because the primary VM and shadow VM utilize different memory pages in different hosts that are inaccessible by other hosts in the cluster, maintaining the shadow copy memory is a time consuming, inefficient, and costly process.

SUMMARY

In one example, fault tolerance for virtual machines (VMs) is enabled using pooled memory accessible by a plurality of VM hosts. On determining that fault tolerance is desired for a primary VM on a first host in the plurality of VM hosts, read and write access to VM memory residing in a shared partition on pooled memory is assigned to the primary VM, and read-only access to the VM memory on the pooled memory is assigned to a secondary VM running on a second host in the plurality of VM hosts. The VM memory is associated with the primary VM. On detecting a failure event on the first host, the read and write access is changed from the primary VM to the secondary VM. The secondary VM having the read and write access is now the new primary VM. The new primary VM on the second host accesses the VM memory on the pooled memory to resume VM processing on the new primary VM without losing a memory state of the primary VM.

BRIEF DESCRIPTION OF THE DRAWINGS

Corresponding reference characters indicate corresponding parts throughout the drawings.

DETAILED DESCRIPTION

Figure 1:
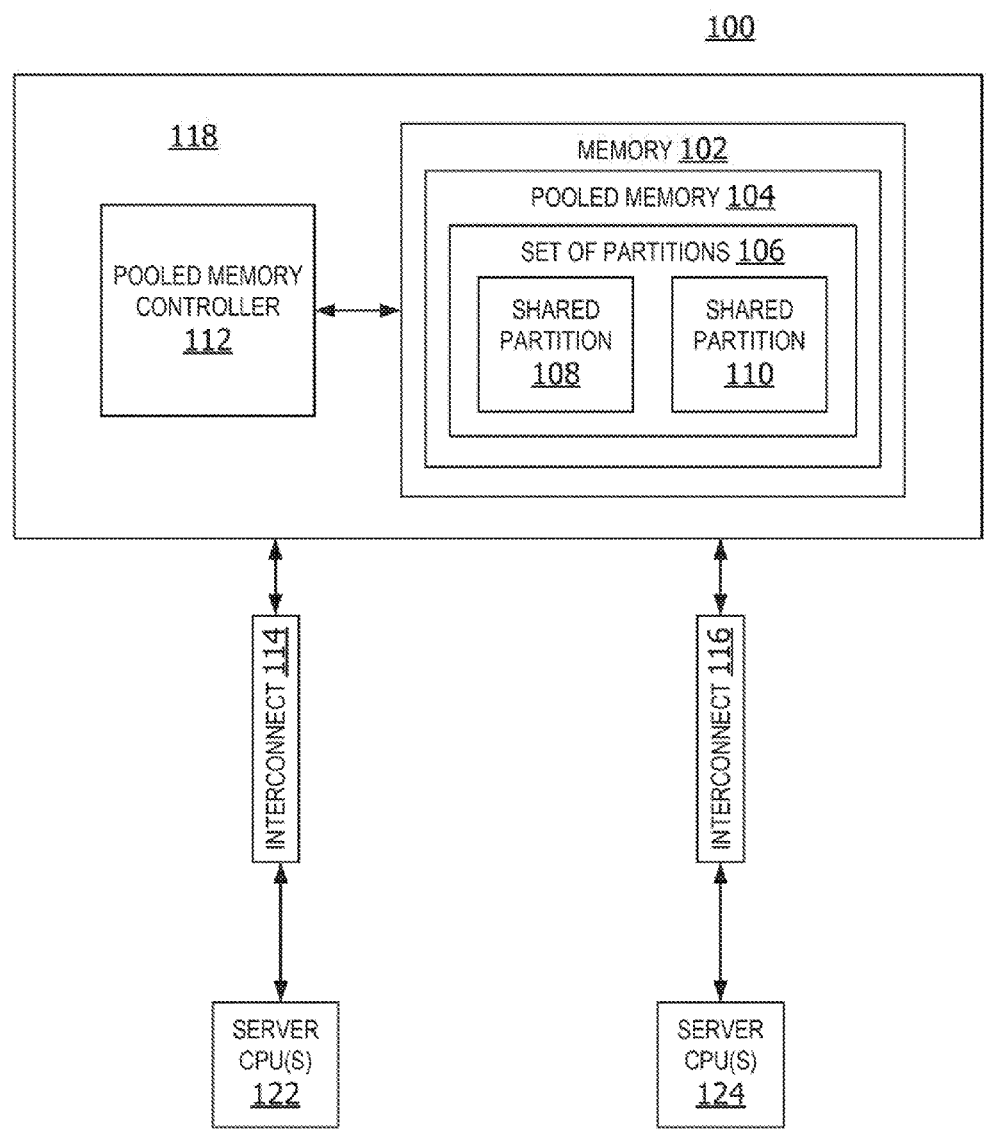
FIG. 1 is a block diagram of a shared memory architecture.

Examples described herein provide for virtual machine (VM) fault tolerance using shared pooled memory. In some examples, a primary VM with read and write access to the VM memory on the shared pooled memory is created on one host and a secondary VM having read-only access to the same VM memory in the same shared memory partition is created on another host. If the host serving the primary VM fails, the secondary VM is granted read and write access to the VM memory and resumes the VM processing without losing memory state of the VM. During this process, a new secondary VM is created and provided with read only access to the primary VM memory for availability of the secondary VM in the cluster for fault tolerant functionality of the VM.

This VM fault tolerance using pooled memory utilizes only a single copy of the VM memory in a single shared partition. The VM memory on pooled memory utilizes only a single chunk of random access memory (RAM) that is common to both the primary VM and the secondary VM instead of using two different chunks of RAM. The pooled memory chunk is accessible to both hosts serving the primary and secondary VMs to reduce the amount of physical memory required for VM fault tolerance.

Utilizing the secondary VM to restart the VM using the pooled memory eliminates the need for memory check pointing during normal operations of the host serving the fault tolerant VM. As used herein, a fault tolerant VM is a VM having fault tolerance using pooled memory enabled.

In one current solution, a shadow copy of the VM is created and maintained using a memory check point process. The current check pointing process stops the virtual central processing units (vcpus), divides physical memory of the primary VM into parts, and has each vcpu thread compute a dirty set of pages for each memory part. An estimate is made as to which pages will most likely be dirtied in the next check-pointing epoch. An epoch is a series of events or a time period marked by particular events or features. The check-pointing epoch in this example includes the events associated with the memory check point process.

If the page is likely to be dirtied again, the page is submitted to the VM kernel for synchronous transport to the shadow VM. If the pages are not likely to be dirtied, the pages are write protected and sent out asynchronously. The process then starts the vcpus. This check point process is time consuming and inefficient. Utilization of the VM memory on the shared pool eliminates the need for check pointing the VM memory between different hosts reducing usage of host resources, increasing efficiency, and reducing or eliminating VM check point time.

In some examples, operations of the VM are not halted to sync memory between different memory locations. Instead, both primary and secondary VMs utilize the same VM memory shared partition. In this case, only the disk contents and central processing unit (CPU) state are synced between the primary and secondary VMs to enable the fault tolerance. This feature improves VM operating efficiency, improves VM and host performance, and reduces processor load by minimizing the amount of RAM that is maintained for VM fault tolerance.

Moreover, it is unnecessary to copy the VM memory from local memory of one host to the local memory of another host because both hosts are able to access the VM memory on the shared pooled memory. This feature eliminates potential errors occurring during copying of memory from local memory of one host to local memory of another host, conserves memory, and reduces host network bandwidth usage. This further reduces overall costs of maintaining fault tolerance for VMs running within a plurality of VM hosts.

In still other examples, fault tolerant logging is performed in a fault tolerance log on the shared memory pool. Both the primary and secondary VM access the same fault tolerant log on the shared pooled memory. This eliminates the need for utilization of network resources for fault tolerant logging between the primary and secondary VM. The fault tolerant logging to the pooled memory reduces network bandwidth usage resulting in less network traffic between hosts.

FIG. 1 is a block diagram of a shared memory architecture for a cluster of VM hosts. The shared memory architecture 100 is a logical architecture that disaggregates memory and allows pooling of memory resources for more efficient utilization of memory. The shared memory architecture 100 in this non-limiting example utilizes server side dual in-line memory (DIMMs) and/or non-volatile dual in-line memory (NVDIMMs) to create a disaggregated memory pool. The memory pools are divided into one or more shared memory pools and one or more dedicated memory pools.

In some non-limiting examples, the shared memory architecture is implemented in a Rack Scale Architecture (RSA). A RSA disaggregates storage, compute, and network resources. An RSA permits pooling of resources for more efficient utilization of assets. An RSA may also be utilized to simplify resource management dynamically allocate resources based on workload-specific demands. One non-limiting example of a RSA includes, but is not limited to, INTEL Rack Scale Architecture. In the specific example of an INTEL RSA, sharing memory beyond a rack may be difficult as some implementations of INTEL RSA are meant to be used within a single server rack.

In this non-limiting example, the memory 102 is implemented in physical random access memory (RAM). The memory 102 may be referred to as main memory. The memory includes pooled memory 104. The pooled memory 104 is shared memory accessible by all server hosts in the cluster of VM hosts connected to the pooled memory 104. The pooled memory 104 enables memory sharing between different hosts within a VM host cluster.

A set of partitions 106 may be provisioned on the pooled memory 104. In this example, the set of partitions 106 includes a set of one or more memory partitions. A partition in the set of partitions may be a per host partition or a shared partition. A shared partition is a partition that is accessible by two or more hosts in a cluster. In some examples, the shared partition is accessible by all hosts in the cluster. In this example, shared partition 108 and shared partition 110 are memory partitions that are accessible by more than one host in the cluster.

A shared partition may be utilized to store data generated or updated by a single host, a single VM, two or more hosts, as well as two or more VMs. In other words, a shared partition that is accessible by multiple different hosts may be locked so as to permit only one host or one VM to generate, update, or otherwise alter data stored in the shared partition.

In this example, the pooled memory includes two shared memory partitions. However, in other examples, the pooled memory may include a single shared partition, no shared partitions, as well as three or more shared partitions.

A pooled memory controller 112 within the pooled memory architecture 118 is a component for managing the pooled RAM. The pooled memory controller in this non-limiting example manages the set of partitions 106 and allocates memory to entities, such as, but not limited to, hosts and/or VMs.

In this example, the memory 102 is shared by all processors associated with the cluster. In this example, the memory is shared by a set of processors including server central processing units (CPUs) 122 and 124. The server CPUs access the memory 102 via one or more interconnects, such as interconnect 114 and/or interconnect 116. This non-limiting example includes two server CPUs and two interconnects. However, other examples include any number of server CPUs and interconnects. For example, the shared memory architecture 100 may include three or more distinct server CPUs in a cluster.

Figure 2:
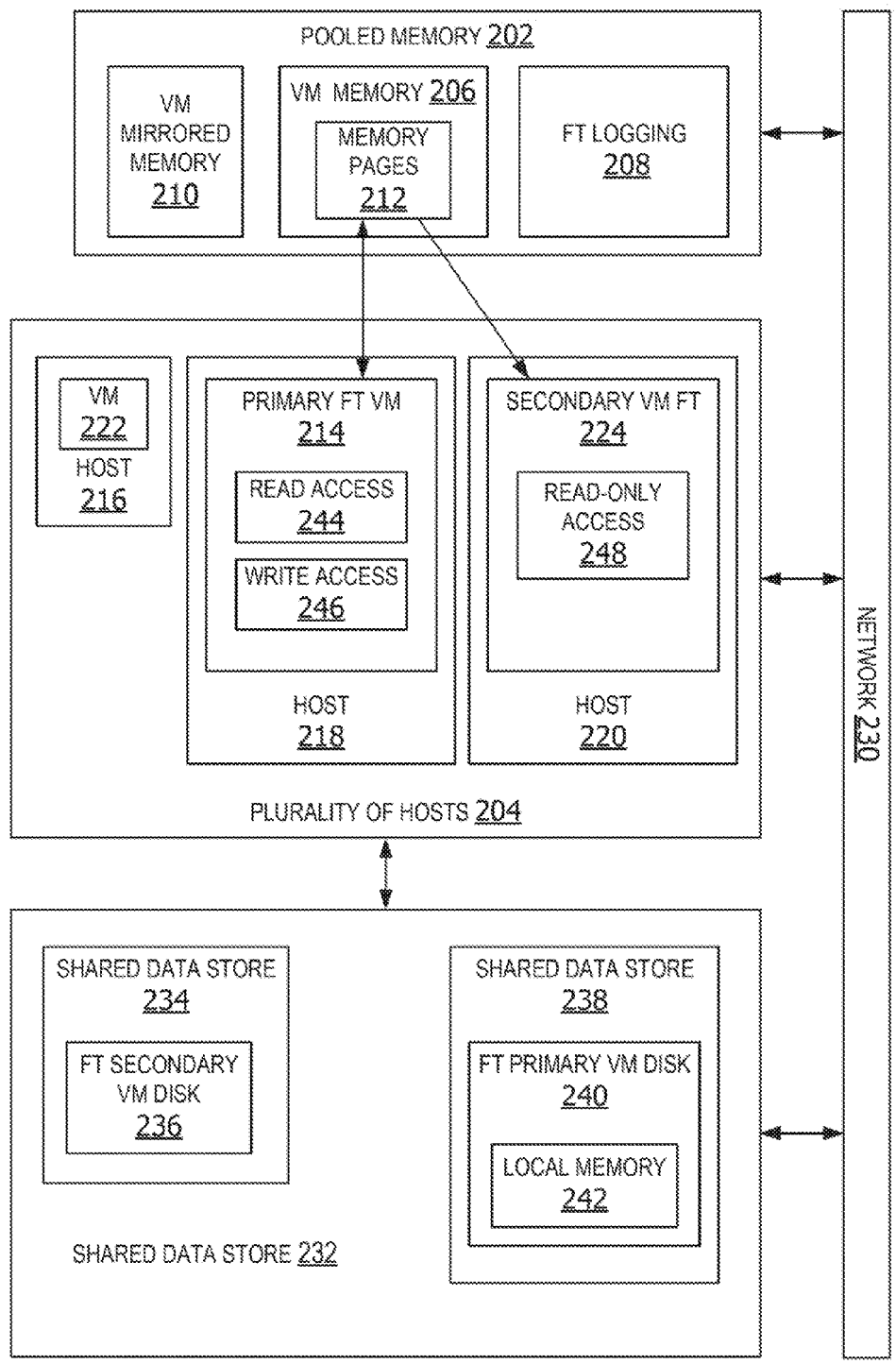
FIG. 2 is a block diagram illustrating virtual machine (VM) fault tolerance in a shared memory architecture.

FIG. 2 is a block diagram illustrating VM fault tolerance in a shared memory architecture. The shared memory architecture 200 in this example includes at least one shared partition in the pooled memory 202 for using pooled memory for fault tolerance of one or more VMs running in a plurality of VM hosts 204.

The pooled memory 202 is sharable memory that is accessible by multiple hosts in a cluster. In some examples, the pooled memory resides on a physical memory device that is physically separate from the hosts but accessible to the hosts in the cluster. In other examples, the pooled memory resides on one or more of the physical host computing devices but is shared with other hosts in the cluster.

The pooled memory 202 includes one or more shared partitions. In this example, the pooled memory includes a shared memory partition in the pooled memory for a VM memory 206, a shared partition for a fault tolerance logging 208, and another shared partition for VM mirrored memory 210. The VM memory 206 in some examples includes one or more memory pages 212 created and updated by a VM such as primary fault tolerant (FT) VM 214.

The plurality of VM hosts 204 is a set of two or more servers capable of hosting one or more VMs. A VM host may be referred to as a node, a host, a server, a host server, a host computing device, or a cluster server. In some non-limiting examples, each host in the plurality of VM hosts is a blade server within a RSA. In other examples, a host is implemented as Elastic Sky X (ESX) or ESXi host from VMware, Inc.

In this example, the plurality of VM hosts 204 includes three hosts, VM host 216, VM host 218, and VM host 220. In other examples, the plurality of VM hosts includes only two hosts, as well as four or more hosts.

Each host is capable of serving one or more VMs. In this example, VM host 216 serves VM 222. The host 218 serves primary VM 214. The host 220 serves VM 224. In this example, hosts 216, 218, and 220 are shown hosting a single VM. However, in other examples, a VM host may be serving any number of VMs. For example a host may server two or more VMs, as well as no VMs.

The plurality of VM hosts 204 are connected to each other via a network 230. The hosts send and receive network heartbeat packages via the network 230. The network 230 in other examples, may connect the hosts to each other and/or connect to the shared data stores 232.

The shared data stores 232 is a data store that is accessible by all hosts in the cluster. The shared data store stores data, such as, but not limited to, databases, file system, files, or other collections of data.

The shared data stores 232 may include a shared data store associated with each host in the plurality of hosts 204. For example, the shared data store 234 associated with fault tolerant secondary VM disk 236 in this example provides local memory for secondary VM 224 running on host 220. The shared data store 238 in this non-limiting example is associated with primary VM disk 240 and provides local memory 242 to the primary VM 214 running on host 218. In other words, the virtual disk for the primary VM is located in a different shared data store than the virtual disk for the secondary VM. In some non-limiting examples, the shared data stores 234 and 238 are implemented as separate storage area networks (SANs).

In this example, primary VM 214 is a fault tolerant VM having read access 244 and write access 246 to VM memory 206 residing on pooled memory 202. In other words, the primary VM 214 has full control of the shared memory location for the VM memory. Although all hosts in the plurality of hosts have access to pooled memory, only the primary VM running on host 218 has write access 246 to create, change, update, or otherwise modify the data in the VM memory for the primary VM.

The secondary VM 224 running on host 220 has read-only access 248 to the VM memory 206. If the host 218 fails, the read access 244 and write access 246 are assigned to the secondary VM. The secondary VM 224 then becomes the new primary VM when it receives the read and write access to the VM memory on the pooled memory. In this example, the new primary VM is created on host 216 and assigned read-only access 248 for the VM memory 206 to ensure the fault tolerant VM remains available with both a primary VM and a secondary VM providing failover support.

Thus, the memory contents of the VM memory is not check pointed because the same memory location in the shared pooled memory is shared by both the primary and secondary VM even though the primary and secondary VMs are running on separate hosts and have their virtual disks in different data stores.

In some examples, the pooled memory includes a shared partition for fault tolerant logging 208. The fault tolerant VM logs fault tolerant events to the fault tolerant log on the shared memory. The fault tolerance log in the shared pooled memory includes entries for one or more fault tolerance related events. If the primary VM host fails, the secondary VM becomes the new primary VM with access to the fault tolerant logging 208 in the shared memory.

The fault tolerance log is shared between both the primary VM and the secondary VM. This shared fault tolerance log enables the primary VM to share fault tolerance information with the secondary VM. In other words, the fault tolerance information is shared between the primary and secondary VM by logging fault tolerance events to at least one shared partition on the pooled memory that is accessible by both the primary and secondary VM.

In other examples, the VM mirrored memory 210 is a shared partition for storing a copy of the VM memory. If the original VM memory is lost, becomes corrupted, or inaccessible, then the VM mirrored memory 210 on a different physical location in memory is utilized by the primary VM.

Figure 3:
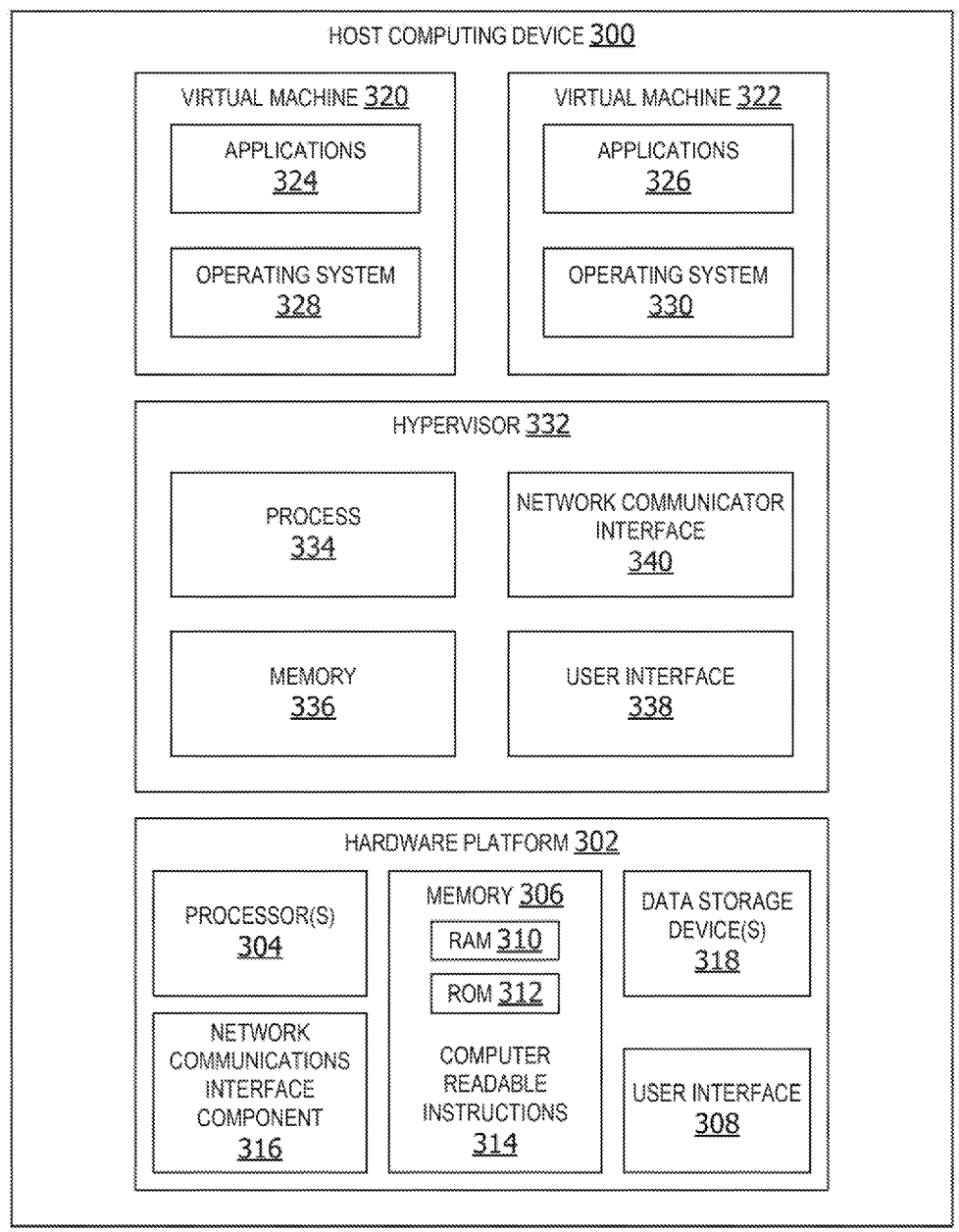
FIG. 3 is a block diagram of a host computing device for serving one or more VMs.

FIG. 3 is a block diagram of a host computing device for serving one or more VMs. The illustrated host computing device 300 may be implemented as any type of host computing device, such as a server. In some non-limiting examples, the host computing device 300 is implemented as a host or ESXi host from VMware, Inc.

The host computing device 300 represents any device executing instructions (e.g., as application(s), operating system, operating system functionality, or both) to implement the operations and functionality associated with the host computing device 300. The host computing device 300 may include desktop personal computers, kiosks, tabletop devices, industrial control devices, wireless charging stations, or server. In some examples, the host computing device 300 is implemented as a blade server within a RSA. Additionally, the host computing device 300 may represent a group of processing units or other computing devices.

The host computing device 300 includes a hardware platform 302. The hardware platform 302, in some examples, includes one or more processor(s) 304, a memory 306, and at least one user interface, such as user interface component 308.

The processor 304 includes any quantity of processing units, and is programmed to execute computer-executable instructions for implementing the examples. The instructions may be performed by the processor or by multiple processors within the host computing device 300, or performed by a processor external to the host computing device 300. In some examples, the processor 304 is programmed to execute instructions such as those illustrated in the figures (e.g., FIG. 9, and FIG. 10.

The host computing device 300 further has one or more computer readable media such as the memory 306. The memory 306 includes any quantity of media associated with or accessible by the host computing device 300. The memory 306 may be internal to the host computing device 300 (as shown in FIG. 3), external to the host computing device (not shown), or both (not shown). In some examples, the memory 306 includes read-only memory (ROM) 310.

The memory 306 further stores a random access memory (RAM) 312. The RAM 312 may be any type of random access memory. In this example, the RAM 312 is part of a shared memory architecture. In some examples, the RAM 312 may optionally include one or more cache(s). The memory 306 further stores one or more computer-executable instructions 314.

The host computing device 300 may optionally include a user interface component 308. In some examples, the user interface component 308 includes a graphics card for displaying data to the user and receiving data from the user. The user interface component 308 may also include computer-executable instructions (e.g., a driver) for operating the graphics card. Further, the user interface component 308 may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor.

In some examples, the hardware platform 302 optionally includes a network communications interface component 316. The network communications interface component 316 includes a network interface card and/or computer-executable instructions (e.g., a driver) for operating the network interface card. Communication between the host computing device 300 and other devices may occur using any protocol or mechanism over any wired or wireless connection. In some examples, the communications interface is operable with short range communication technologies such as by using near-field communication (NFC) tags.

The data storage device(s) 318 may be implemented as any type of data storage, including, but without limitation, a hard disk, optical disk, a redundant array of independent disks (RAID), a solid state drive (SSD), a flash memory drive, a storage area network (SAN), or any other type of data storage device. The data storage device(s) 318 may include rotational storage, such as a disk. The data storage device(s) 318 may also include non-rotational storage media, such as SSD or flash memory. In some non-limiting examples, the data storage device(s) 218 provide a shared data store, such as shared data store 242 in FIG. 2.

The host computing device 300 hosts one or more VMs, such as VMs 320 and 322. The VM 320 includes, among other data, one or more application(s), such as application(s) 324. The VM 322 includes data, such as applications 326. The application(s), when executed by the processor(s) 304, operate to perform functionality on the host computing device 300. Exemplary application(s) include, without limitation, mail application programs, web browsers, calendar application programs, address book application programs, messaging programs, media applications, location-based services, search programs, and the like. The application(s) may communicate with counterpart applications or services such as web services accessible via a network. For example, the applications may represent downloaded client-side applications that correspond to server-side services executing in a cloud.

In this example, each VM includes a guest operating system (OS), such as operating system. In this example, VM 320 includes guest operating system (OS) 328 and VM 322 includes guest OS 330.

The host computing device 300 further includes one or more computer executable components. Exemplary components include a hypervisor 332. The hypervisor 332 is a VM monitor that creates and runs one or more VMs, such as, but without limitation, VM 320 or VM 322. In one example, the hypervisor 332 is implemented as a vSphere Hypervisor from VMware, Inc.

The host computing device 300 running the hypervisor 332 is a host machine. VM 320 is a guest machine. The hypervisor 332 presents the OS 328 of the VM 320 with a virtual hardware platform. The virtual hardware platform may include, without limitation, virtualized process 334, memory 336, user interface device 338, and network communication interface 340. The virtual hardware platform, VM(s) and the hypervisor are illustrated and described in more detail in FIG. 16 below.

Figure 4:
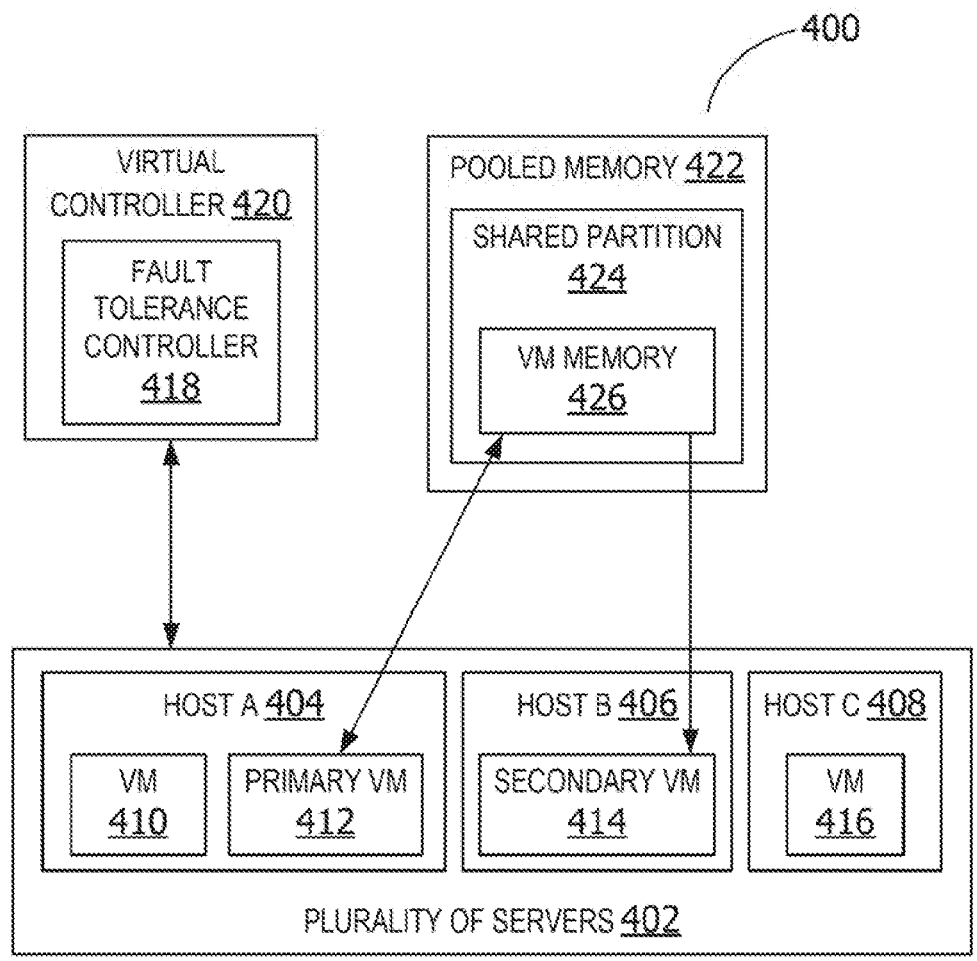
FIG. 4 is a block diagram of a fault tolerance controller associated with a plurality of hosts in a cluster.

FIG. 4 is a block diagram of a fault tolerance controller associated with a plurality of hosts in a cluster. In this example, a shared memory architecture includes a plurality of servers 402. The plurality of servers includes two or more VM hosts, such as host 404, host 406, and host 408. In other examples, the plurality of servers 402 may include two hosts, as well as four or more hosts.

A host may serve one or more VMs. In this example, host 404 is associated with VM 410 and primary VM 412. The primary VM 412 is a VM enabled for fault tolerance. The host 406 includes secondary VM 414. The host 408 serves VM 416.

In some examples, a user enables fault tolerance using pooled memory by selecting an option for enabling host fault tolerance networking for a host through shared memory pool in a user interface. The user interface in some examples includes an option for turning on fault tolerance using shared memory pool. Thus, if a user selects the option to turn on fault tolerance using the shared memory pool via the user interface, the fault tolerance using pooled memory is enabled for the selected VM. The host running the selected fault tolerant VM is enabled for fault tolerance networking through the shared memory pool. This enables the host to access the fault tolerance log in the pooled memory.

When a user selects to enable fault tolerance using pooled memory 422 for VM 412, the fault tolerance controller 418 on virtual controller 420. The virtual controller may be implemented as a VCenter server. The fault tolerance controller 418 creates the secondary VM 414 on a different host. In other words, the primary VM 412 runs on one host and the secondary VM runs on a different host associated with a different VM disk.

The fault tolerance controller 418 provisions a shared partition 424 in the pooled memory 422 for the VM memory 426 associated with the primary VM. The VM memory 426 may be referred to as primary VM memory. The primary VM 412 has read and write access to the VM memory 426. The primary VM 412 performs the operations and workload assigned to the VM.

In this example, the secondary VM does not perform operations or workload of the primary VM. The secondary VM is essentially in a stand-by or maintenance mode. The secondary VM 414 has read access to the VM memory 426. The secondary VM can access the VM memory but the secondary VM cannot change, update, or otherwise modify the VM memory on the pooled memory because the secondary VM does not have write access to the VM memory 412.

In other examples, the secondary VM does execute the same operations as the primary VM in lockstep. However, the secondary VM does not write to the VM memory stored in the shared partition of the pooled memory.

Figure 5:
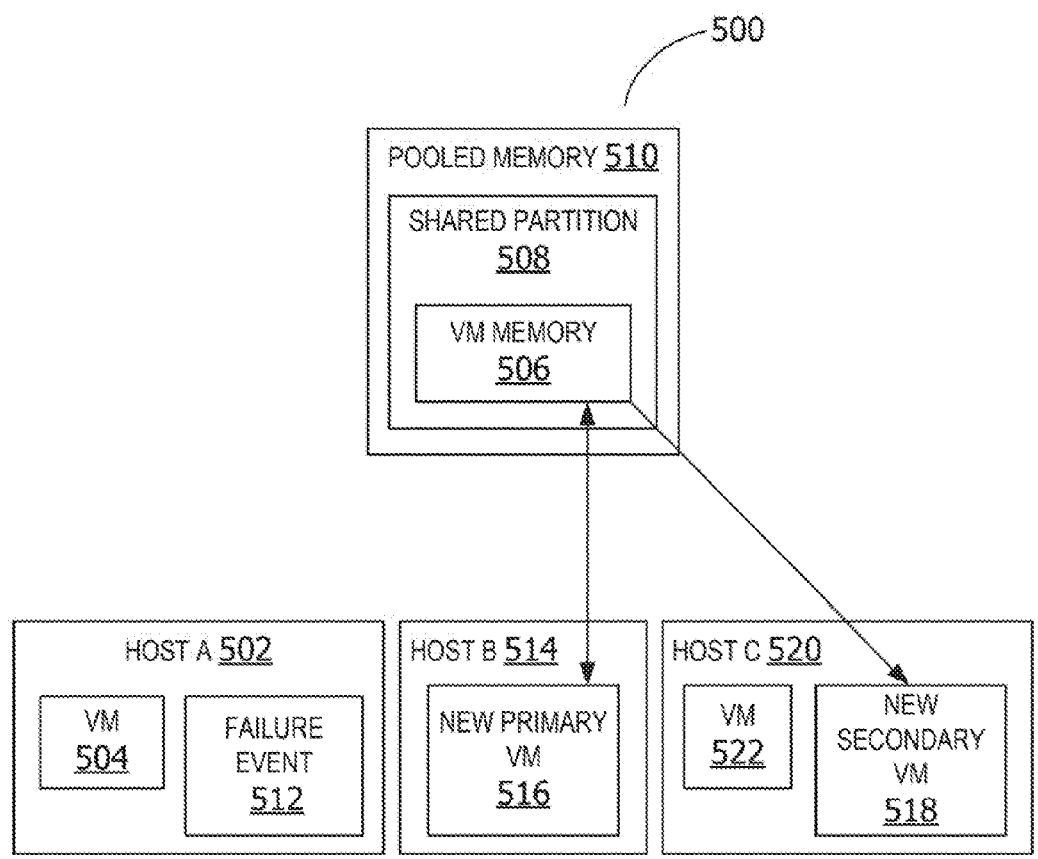
FIG. 5 is a block diagram of a VM memory on a shared memory partition for converting a secondary VM into a new primary VM following a host failure or host isolation event.

FIG. 5 is a block diagram of a VM memory on a shared memory partition for converting a secondary VM into a new primary VM following a host failure or host isolation event. The VM host cluster 500 in this example includes the host 502 hosting a VM 504 and a primary VM enabled for fault tolerance using pooled memory. The VM memory 506 for the primary VM is maintained in a shared partition 508 in the pooled memory 510.

In this example, a failure event 512 occurs on the host 502. The failure event 512 in some examples is a server crash. In other examples, the failure event 512 is a host network isolation or loss of pooled memory connectivity.

In response to the failure event 512 on the host 502, the secondary VM running on host 514 is granted read access and write access to the VM memory 506 in the shared partition 508. The secondary VM becomes a new primary VM 516 when the VM obtains the read and write access to the VM memory 506.

A new secondary VM 518 is created on a different host 520. The host 520 running the new secondary VM 518 is a different host than the host serving the new primary VM 516. The new secondary VM 518 is given read-only access to the VM memory 506 on the shared partition 508. The new secondary VM 518 is created and provided with read only access to the primary VM memory for availability of secondary VM in the cluster for fault tolerance functionality of the VM.

The host 520 running the new secondary VM 518 in some examples may include one or more other VMs, such as VM 522. The one or more other VMs may include VMs enabled for fault tolerance using pooled memory or VMs not enabled for fault tolerance using pooled memory.

Figure 6:
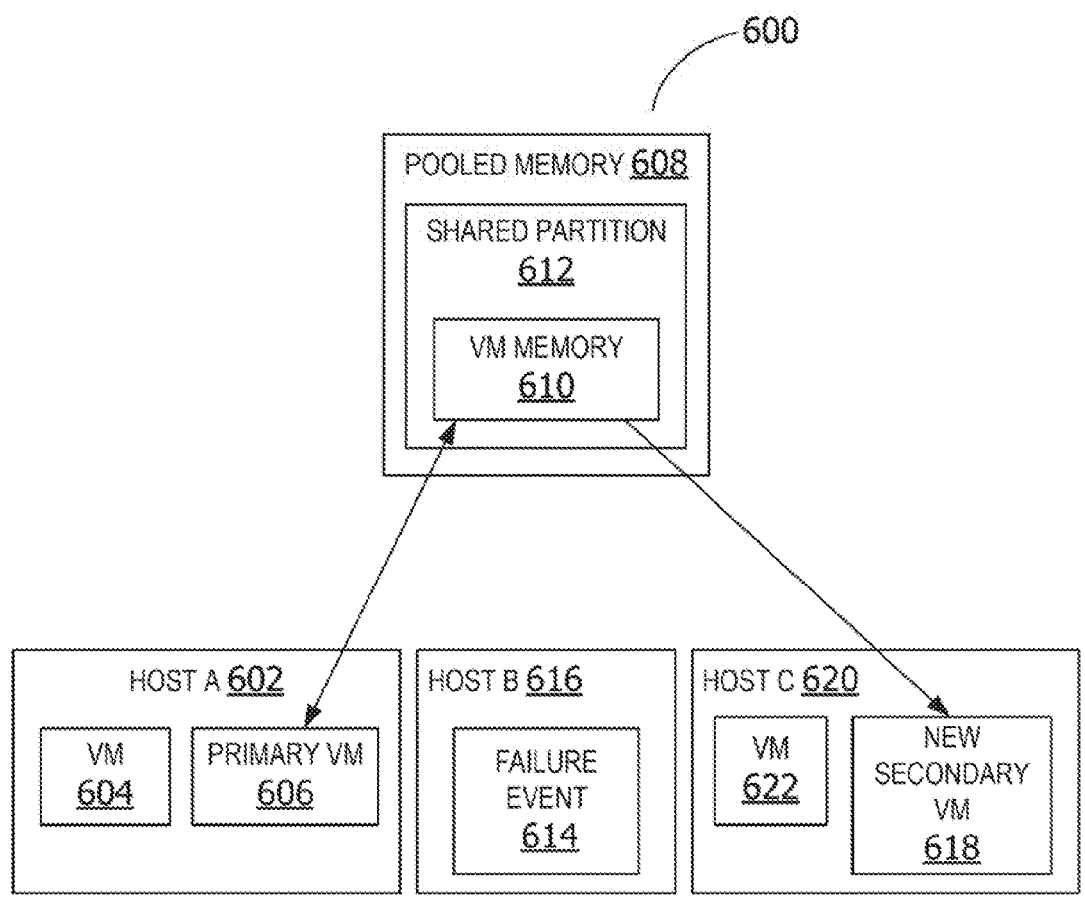
FIG. 6 is a block diagram of a VM memory on a shared memory partition for creating a new secondary VM following a host failure or host isolation event.

FIG. 6 is a block diagram of a VM memory on a shared memory partition for creating a new secondary VM following a host failure or host isolation event. In this example, the shared memory architecture 600 includes host 602. The host 602 serves a VM 604 which is not enabled for fault tolerance using pooled memory and a primary VM 606 enabled for fault tolerance using the pooled memory 608. The primary VM 606 has read and write access to the VM memory 610 in the shared partition 612.

In this example, a failure event 614 is detected on host 616 serving the secondary VM associated with the primary VM 606. The fault tolerance controller creates a new secondary VM 618 on a different host 620. The new secondary VM 618 is assigned read-only access to the VM memory 610.

The host serving the new secondary VM in this example also serves VM 622. The VM 622 may be a VM enabled for fault tolerance from pooled memory or a VM not enabled for fault tolerance using the pooled memory. In other words, a user may select to enable fault tolerance using the pooled memory 608 for one VM running on host 620 and disable fault tolerance using pooled memory for another VM running on the same host 620.

Figure 7:
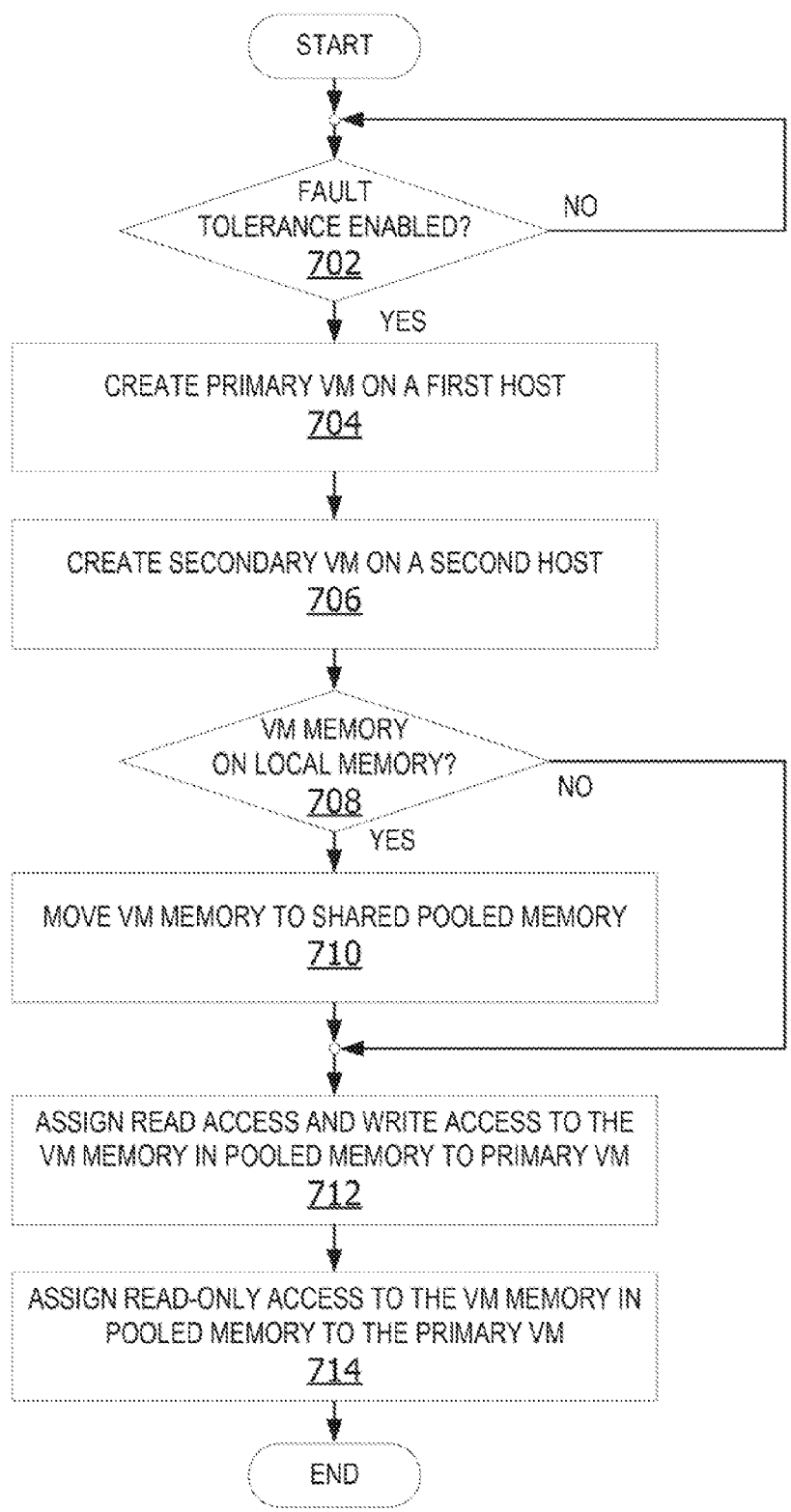
FIG. 7 is a flowchart of a process for configuration of a pooled memory for VM fault tolerance.

FIG. 7 is a flowchart of a process for configuration of a pooled memory for VM fault tolerance. The process shown in FIG. 7 may be performed by a server or virtual controller, such as, but not limited to, virtual controller 418 in FIG. 4. Further, execution of the operations illustrated in FIG. 7 is not limited to a virtual controller. One or more computer-readable storage media storing computer-readable instructions may execute to cause at least one processor to implement the operations illustrated in FIG. 7.

A determination is made as to whether fault tolerance is enabled for a VM at 702. If yes, a primary VM is created on a first host at 704. A secondary VM is created on a second host at 706. A determination is made as to whether the VM memory is on local memory at 708. If yes, the VM memory is moved from the local memory to the shared pooled memory at 710. Read and write access for the VM memory is assigned to the primary VM at 712. Read-only access for the VM memory is assigned to the secondary VM at 714. The process terminates thereafter.

While the operations illustrated in FIG. 7 are described as being performed by a host computing device or a server, aspects of the disclosure contemplate that performance of the operations by other entities. For example, a cloud service may perform one or more of the operations.

Figure 8:
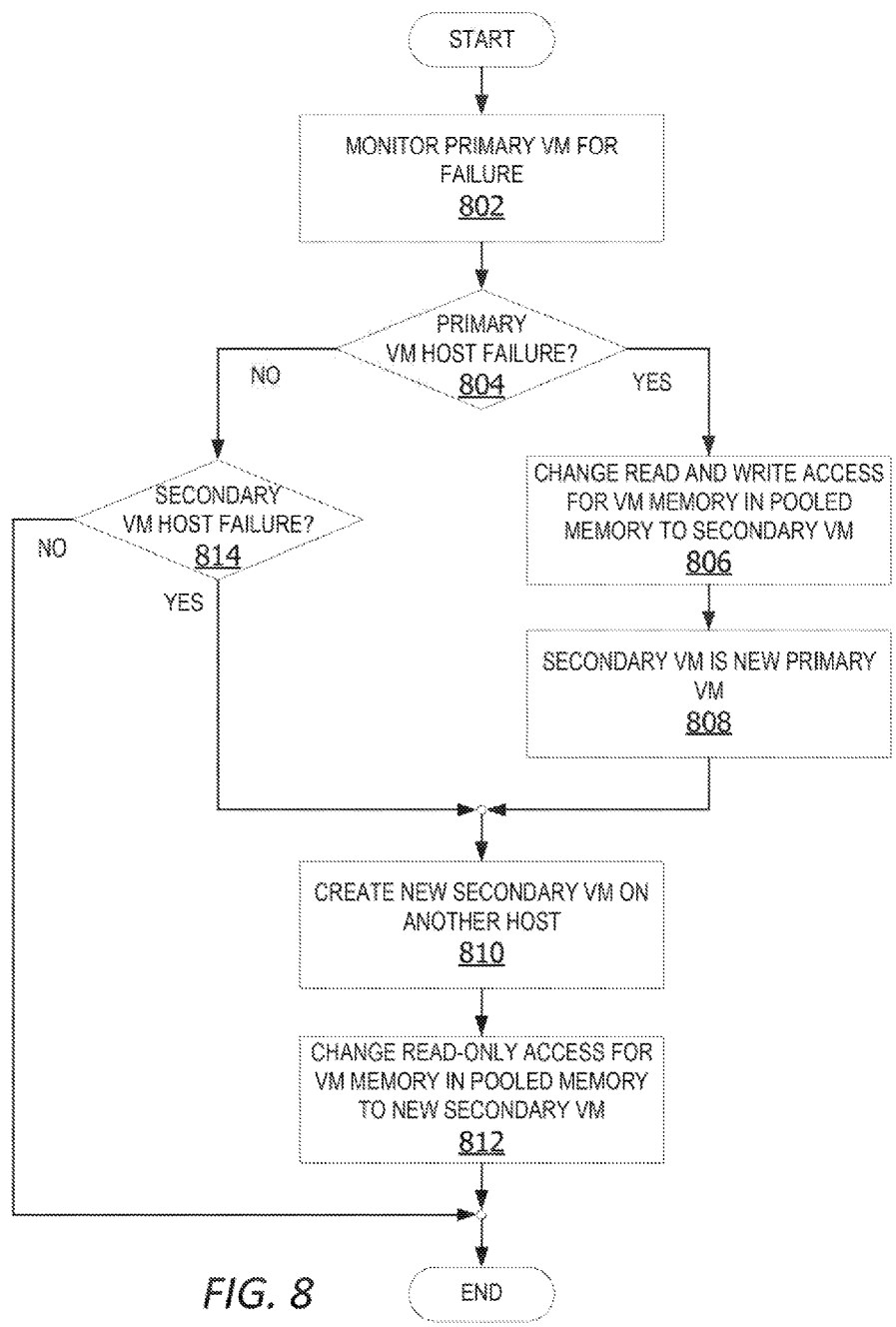
FIG. 8 is another flowchart of a process for configuration of a pooled memory for VM fault tolerance.

FIG. 8 is a flowchart of a process for configuration of a pooled memory for VM fault tolerance. The process shown in FIG. 8 may be performed by a server or virtual controller, such as, but not limited to, virtual controller 418 in FIG. 4. Further, execution of the operations illustrated in FIG. 8 is not limited to a virtual controller. One or more computer-readable storage media storing computer-readable instructions may execute to cause at least one processor to implement the operations illustrated in FIG. 8.

A primary VM host is monitored for failure at 802. A determination is made as to whether the primary VM host fails at 804. If yes, read and write access for the VM memory in pooled memory is changed from the primary VM to the secondary VM at 806. A secondary VM is the new primary VM at 808. A new secondary VM is created on another host at 810. Read-only access for the VM memory in the pooled memory is changed from the original secondary VM to the new secondary VM at 812. The process terminates thereafter.

Returning to 804, if the primary VM host is not failed, a determination is made as to whether there is a failure of the secondary VM host at 814. If no, the process terminates thereafter.

Returning to 814, if a secondary VM host failure occurs, a new secondary VM is created on another host at 810. Read-only access for the VM memory in pooled memory is assigned to the new secondary VM at 812. The process terminates thereafter.

While the operations illustrated in FIG. 8 are described as being performed by a host computing device or a server, aspects of the disclosure contemplate that performance of the operations by other entities. For example, a cloud service may perform one or more of the operations.

Figure 9:
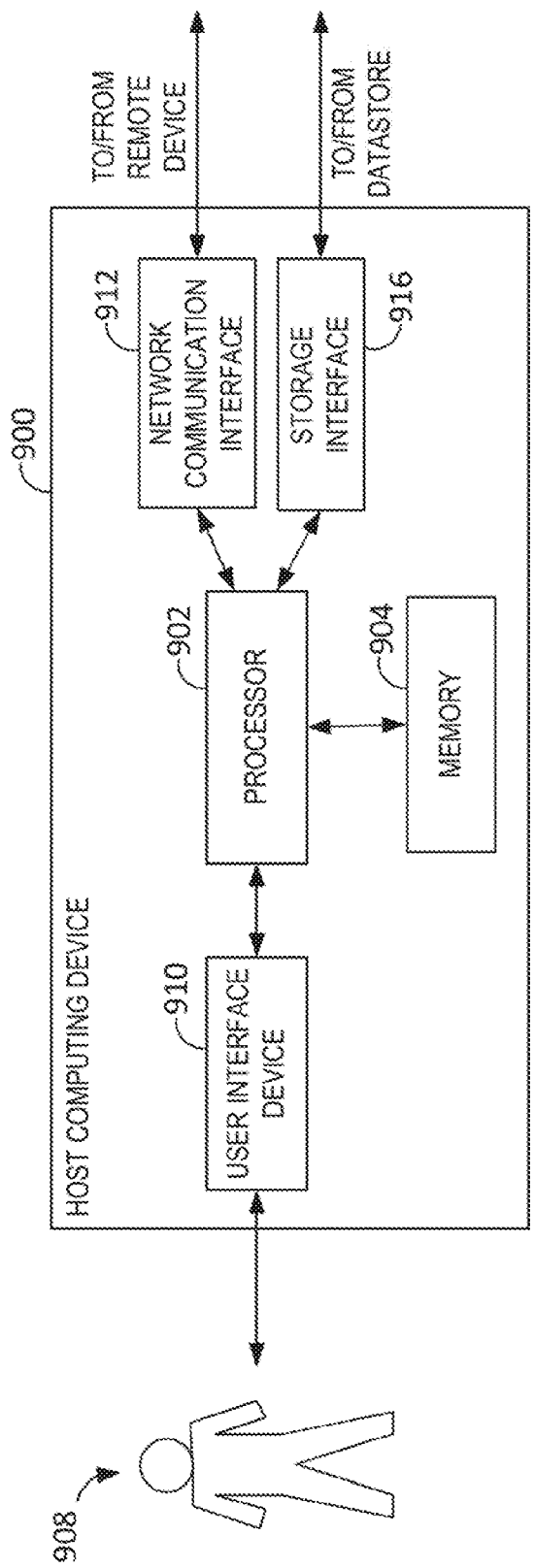
FIG. 9 is a block diagram of an exemplary host computing device.

FIG. 9 is a block diagram of an example host computing device 900. Host computing device 900 includes a processor 902 for executing instructions. In some examples, executable instructions are stored in a memory 904. Memory 904 is any device allowing information, such as executable instructions and/or other data, to be stored and retrieved. For example, memory 904 may include one or more random access memory (RAM) modules, flash memory modules, hard disks, solid state disks, and/or optical disks.

Host computing device 900 may include a user interface device 910 for receiving data from a user 908 and/or for presenting data to user 908. User 908 may interact indirectly with host computing device 900 via another computing device such as VMware's vCenter Server or other management device. User interface device 910 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 910 operates to receive data from user 908, while another device (e.g., a presentation device) operates to present data to user 908. In other examples, user interface device 910 has a single component, such as a touch screen, that functions to both output data to user 908 and receive data from user 908. In such examples, user interface device 910 operates as a presentation device for presenting information to user 908. In such examples, user interface device 910 represents any component capable of conveying information to user 908. For example, user interface device 910 may include, without limitation, a display device (e.g., a liquid crystal display (LCD), organic light emitting diode (OLED) display, or "electronic ink" display) and/or an audio output device (e.g., a speaker or headphones). In some examples, user interface device 910 includes an output adapter, such as a video adapter and/or an audio adapter. An output adapter is operatively coupled to processor 902 and configured to be operatively coupled to an output device, such as a display device or an audio output device.

Host computing device 900 also includes a network communication interface 912, which enables host computing device 900 to communicate with a remote device (e.g., another computing device) via a communication medium, such as a wired or wireless packet network. For example, host computing device 900 may transmit and/or receive data via network communication interface 912. User interface device 910 and/or network communication interface 912 may be referred to collectively as an input interface and may be configured to receive information from user 908.

Host computing device 900 further includes a storage interface 916 that enables host computing device 900 to communicate with one or more data stores, which store virtual disk images, software applications, and/or any other data suitable for use with the methods described herein. In example examples, storage interface 916 couples host computing device 900 to a storage area network (SAN) (e.g., a Fibre Channel network) and/or to a network-attached storage (NAS) system (e.g., via a packet network). The storage interface 916 may be integrated with network communication interface 912.

Figure 10:
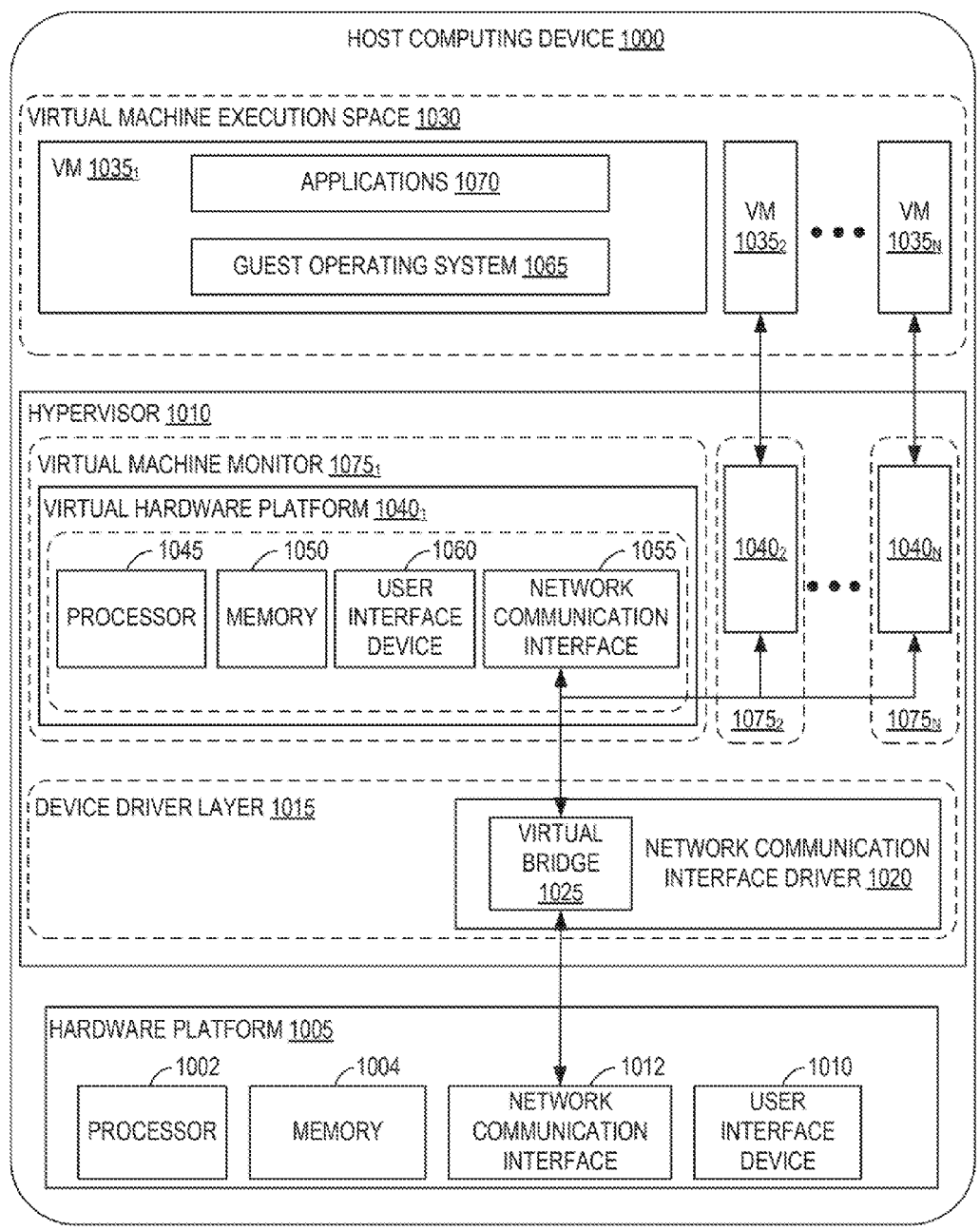
FIG. 10 is a block diagram of VMs that are instantiated on host computing device.

FIG. 10 depicts a block diagram of VMs $1035_1$, $1035_2$ ... $1035_N$ that are instantiated on host computing device 1000. Host computing device 1000 includes a hardware platform 1005, such as an architecture platform. Hardware platform 1005 may include processor 1002, memory 1004, network communication interface 1012, user interface device 1010, and other input/output (I/O) devices, such as a presentation device. A virtualization software layer is installed on top of hardware platform 1005. The virtualization software layer in this example includes a hypervisor 1010, The virtualization software layer supports a VM execution space 1030 within which multiple virtual machines (VMs $1035_1$-$1035_N$) may be concurrently instantiated and executed. Hypervisor 1010 includes a device driver layer 1015, and maps physical resources of hardware platform 1005 (e.g., processor 1002, memory 1004, network communication interface 1012, and/or user interface device 1010) to "virtual" resources of each of VMs $1035_1$-$1035_N$ such that each of VMs $1035_1$-$1035_N$ has its own virtual hardware platform (e.g., a corresponding one of virtual hardware platforms $1040_1$-$1040_N$), each virtual hardware platform having its own emulated hardware (such as a processor 1045, a memory 1050, a network communication interface 1055, a user interface device 1060 and other emulated I/O devices in VM $1035_1$). Hypervisor 1010 may manage (e.g., monitor, initiate, and/or terminate) execution of VMs $1035_1$-$1035_N$ according to policies associated with hypervisor 1010, such as a policy specifying that VMs $1035_1$-$1035_N$ are to be automatically restarted upon unexpected termination and/or upon initialization of hypervisor 1010. In addition, or alternatively, hypervisor 1010 may manage execution VMs $1035_1$-$1035_N$ based on requests received from a device other than host computing device 1000. For example, hypervisor 1010 may receive an execution instruction specifying the initiation of execution of first VM 1035 from a management device via network communication interface 1012 and execute the execution instruction to initiate execution of first VM 1035t.

In some examples, memory 1050 in first virtual hardware platform $1040_1$ includes a virtual disk that is associated with or "mapped to" one or more virtual disk images stored on a disk (e.g., a hard disk or solid state disk) of host computing device 1000. The virtual disk image represents a file system (e.g., a hierarchy of directories and files) used by first VM $1035_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 1015 includes, for example, a communication interface driver 1020 that interacts with network communication interface 1012 to receive and transmit data from, for example, a local area network (LAN) connected to host computing device 100. Communication interface driver 1020 also includes a virtual bridge 1025 that simulates the broadcasting of data packets in a physical network received from one communication interface (e.g., network communication interface 1012) to other communication interfaces (e.g., the virtual communication interfaces of VMs $1035_1$-$1035_N$). Each virtual communication interface for each VM $1035_1$-$1035_N$, such as network communication interface 1055 for first VM $1035_1$, may be assigned a unique virtual Media Access Control (MAC) address that enables virtual bridge 1025 to simulate the forwarding of incoming data packets from network communication interface 1012. In an example, network communication interface 1012 is an Ethernet adapter that is configured in "promiscuous mode" such that all Ethernet packets that it receives (rather than just Ethernet packets addressed to its own physical MAC address) are passed to virtual bridge 1025, which, in turn, is able to further forward the Ethernet packets to VMs $1035_1$-$1035_N$. This configuration enables an Ethernet packet that has a virtual MAC address as its destination address to properly reach the VM in host computing device 1000 with a virtual communication interface that corresponds to such virtual MAC address.

Virtual hardware platform $1040_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 1065 in order to execute applications 1070 for an instantiated VM, such as first VM $1035_1$. Virtual hardware platforms $1040_1$-$1040_N$ may be considered to be part of virtual machine monitors (VMM) $1075_1$-$1075_N$ that implement virtual system support to coordinate operations between hypervisor 1010 and corresponding VMs $1035_1$-$1035_N$. Those with ordinary skill in the art will recognize that the various terms, layers, and categorizations used to describe the virtualization components in FIG. 10 may be referred to differently without departing from their functionality or the spirit or scope of the disclosure. For example, virtual hardware platforms $1040_1$-$1400_N$ may also be considered to be separate from VMMs $1075_1$-$1075_N$, and VMMs $1075_1$-$1075_N$ may be considered to be separate from hypervisor 1010. One example of hypervisor 1010 that may be used in an example of the disclosure is included as a component in VMware's ESX brand software, which is commercially available from VMware, Inc.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In the foregoing examples, VMs are used as an example for the containers and hypervisors as an example for the hardware abstraction layer. Each VM generally includes a guest operating system in which at least one application runs. It should be noted that these examples may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices. In some examples, the computing system environment includes a first computer system at a first site and/or a second computer system at a second site. The first computer system at the first site in some non-limiting examples executes program code, such as computer readable instructions stored on non-transitory computer readable storage medium.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for providing fault tolerant VMs using pooled memory. For example, the elements illustrated in FIG. 1, FIG. 2, FIG. 3, FIG. 4, FIG. 5, FIG. 6, FIG. 9, and FIG. 10 such as when encoded to perform the operations illustrated in FIG. 7 and FIG. 8, constitute exemplary means for monitoring a primary VM on a first host enabled for fault tolerance using virtual memory, exemplary means for detecting a failure event on the first host, exemplary means for assigning read and write access to VM memory in a shared pooled memory to a secondary VM to create a new primary VM on a second host, and exemplary means for creating a new secondary VM host on a third host.

Some implementations may be combined with mirroring, redundancy, and other redundant array of independent disks (RAID) features to allow for partial failures in the shared memory pool. For example, if shared memory is backed by memory chips in each host, the failure of a single host may affect the overall memory pool in some way (e.g., some portion of a VM's memory may be inaccessible due the failure of a host that is seemingly unrelated to the host where the VM is running). The RAID features mitigate the effects of these failures.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C." As used herein, the term "set" refers to one or more, unless defined otherwise herein.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for virtual machine (VM) fault tolerance using pooled memory, the method comprising:
   on determining fault tolerance is enabled for a primary VM on a first host in a plurality of VM hosts, assigning read and write access to VM memory residing in a shared partition on pooled memory to the primary VM and assigning read-only access to the VM memory on the pooled memory to a secondary VM running on a second host in the plurality of VM hosts, the VM memory associated with the primary VM, the pooled memory is accessible by the plurality of VM hosts;

on detecting a failure event on the first host, changing the read and write access from the primary VM to the secondary VM, the secondary VM having the read and write access is a new primary VM; and accessing the VM memory on the pooled memory by the new primary VM on the second host to resume VM processing on the new primary VM without losing a memory state of the primary VM.

2. The method of claim 1, wherein the secondary VM is a previous secondary VM and further comprising:

creating a new secondary VM on a third host in the plurality of hosts; and changing the read-only access from the previous secondary VM to the new secondary VM.

3. The method of claim 1, further comprising:

monitoring the primary VM on the first host and the secondary VM on the second host for the failure event;

on detecting the failure event on the second host, creating a new secondary VM on another host in the plurality of hosts; and assigning the read-only access to the VM memory to the new secondary VM.

4. The method of claim 1, further comprising:

on determining the primary VM is enabled for fault tolerance (FT) using the pooled memory, determining whether the VM memory is located on local memory; and on determining the VM memory is located on the local memory of the VM, moving the VM memory to at least one shared partition on the pooled memory.

5. The method of claim 1, further comprising:

on determining memory mirroring is enabled, creating a first shared partition in the pooled memory for the VM memory and creating a second shared partition in the pooled memory for the mirrored VM memory; and creating a copy of the VM memory in the second shared partition to create the mirrored VM memory.

6. The method of claim 1, further comprising:

on determining pooled memory FT logging is enabled, creating a shared partition in the pooled memory for the FT logging; and logging FT events to an FT log located in an FT logging shared partition on the pooled memory.

7. The method of claim 1, wherein the VM memory in the pooled memory comprises memory pages for the primary VM.

8. A computer system comprising:

a processor; and a non-transitory computer readable medium having stored thereon program code for virtual machine (VM) fault tolerance using pooled memory accessible by a plurality of hosts, the pooled memory comprising at least one shared partition, the program code causing the processor to:

on determining fault tolerance is enabled for a primary VM on a first host in a plurality of VM hosts, assign read and write access to VM memory residing in a shared partition on pooled memory to the primary VM and assigning read-only access to the VM memory on the pooled memory to a secondary VM running on a second host in the plurality of VM hosts, the VM memory associated with the primary VM, the pooled memory is accessible by the plurality of VM hosts;

on detecting a failure event on the first host, change the read and write access from the primary VM to the secondary VM, the secondary VM having the read and write access is a new primary VM; and access the VM memory on the pooled memory by the new primary VM on the second host to resume VM processing on the new primary VM without losing a memory state of the primary VM.

9. The computer system of claim 8, further comprising:

a new secondary VM created on a third host in the plurality of hosts, wherein the program code further causes the processor to change the read-only access from the previous secondary VM to the new secondary VM.

10. The computer system of claim 8, wherein the program code is further executed to cause the processor to:

monitor the primary VM on the first host and the secondary VM on the second host for the failure event; and on detecting the failure event on the second host, create a new secondary VM on another host in the plurality of hosts; and assign the read-only access to the VM memory to the new secondary VM.

11. The computer system of claim 10, wherein the program code further causes the processor to determine whether the VM memory is located on local memory on determining the primary VM is enabled for fault tolerance using the pooled memory; and move the VM memory to at least one shared partition on the pooled memory on determining the VM memory is located on the local memory of the VM.

12. The computer system of claim 8, further comprising:

a mirrored VM memory, wherein the program code further causing the processor to create a first shared partition in the pooled memory for the VM memory and create a second shared partition in the pooled memory for the mirrored VM memory on determining memory mirroring is enabled; and create a copy of the VM memory in the second shared partition to create the mirrored VM memory.

13. The computer system of claim 8, further comprising:

a FT log, wherein the program code is further executed to cause the processor to create a shared partition in the pooled memory for the FT log and log FT events to the FT log located in the shared partition on the pooled memory.

14. The computer system of claim 8, wherein the VM memory in the pooled memory comprises memory pages for the primary VM.

15. A non-transitory computer readable storage medium having stored thereon program code executable by a first computer system at a first site, the program code embodying a method comprising:

on determining fault tolerance is enabled for a primary VM on a first host in a plurality of VM hosts, assigning read and write access to VM memory residing in a shared partition on pooled memory to the primary VM and assigning read-only access to the VM memory on the pooled memory to a secondary VM running on a second host in the plurality of VM hosts, the VM memory associated with the primary VM, the pooled memory is accessible by the plurality of VM hosts;

on detecting a failure event on the first host, changing the read and write access from the primary VM to the secondary VM, the secondary VM having the read and write access is a new primary VM; and accessing the VM memory on the pooled memory by the new primary VM on the second host to resume VM processing on the new primary VM without losing a memory state of the primary VM.

16. The non-transitory computer readable storage medium of claim 15, wherein the program code embodying the method further comprises:

creating a new secondary VM on a third host in the plurality of hosts; and changing the read-only access from the previous secondary VM to the new secondary VM.

17. The non-transitory computer readable storage medium of claim 15, wherein the program code embodying the method further comprises:

monitoring the primary VM on the first host and the secondary VM on the second host for the failure event;

on detecting the failure event on the second host, creating a new secondary VM on another host in the plurality of hosts; and assigning the read-only access to the VM memory to the new secondary VM.

18. The non-transitory computer readable storage medium of claim 15, wherein the program code embodying the method further comprises:

on determining the primary VM is enabled for fault tolerance using the pooled memory, determining whether the VM memory is located on local memory; and on determining the VM memory is located on the local memory of the VM, moving the VM memory to at least one shared partition on the pooled memory.

19. The non-transitory computer readable storage medium of claim 15, wherein the program code embodying the method further comprises:

on determining memory mirroring is enabled, creating a first shared partition in the pooled memory for the VM memory and creating a second shared partition in the pooled memory for the mirrored VM memory; and creating a copy of the VM memory in the second shared partition to create the mirrored VM memory.

20. The non-transitory computer readable storage medium of claim 15, wherein the program code embodying the method further comprises:

on determining pooled memory FT logging is enabled, creating a shared partition in the pooled memory for the FT logging; and logging FT events to an FT log located in an FT logging shared partition on the pooled memory.

\* \* \* \* \*